Dec. 9, 1924.                                                          1,518,464
E. L. STEPHENS
CLUTCH PEDAL LATCH FOR MOTOR VEHICLES
Filed Dec. 3, 1923                         2 Sheets-Sheet 1

Inventor

E. L. Stephens

By Lacey & Lacey, Attorneys

Dec. 9, 1924. 1,518,464
E. L. STEPHENS
CLUTCH PEDAL LATCH FOR MOTOR VEHICLES
Filed Dec. 3, 1923 2 Sheets-Sheet 2
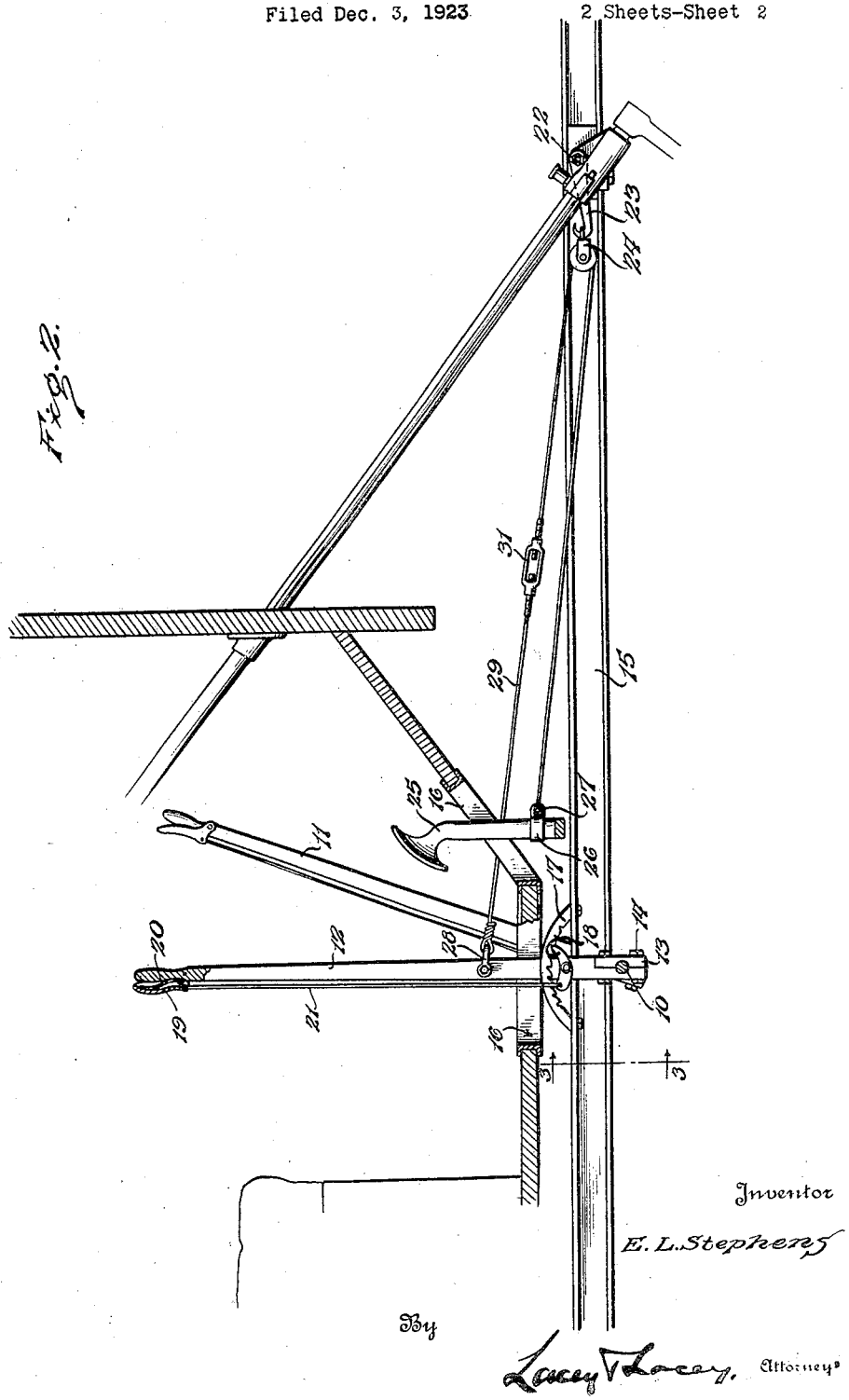

Patented Dec. 9, 1924.

1,518,464

UNITED STATES PATENT OFFICE.

ESCHOL L. STEPHENS, OF RUTHERFORD, WEST VIRGINIA.

CLUTCH-PEDAL LATCH FOR MOTOR VEHICLES.

Application filed December 3, 1923. Serial No. 678,330.

*To all whom it may concern:*

Be it known that I, ESCHOL L. STEPHENS, a citizen of the United States, residing at Rutherford, in the county of Ritchie and State of West Virginia, have invented certain new and useful Improvements in Clutch-Pedal Latches for Motor Vehicles, of which the following is a specification.

This invention relates to an improved clutch pedal latch particularly designed for use upon Ford vehicles and seeks, among other objects, to provide a simple and efficient device for relieving the driver of the vehicle of the tiresome task of pressing forwardly on the clutch pedal when traveling at low speed, as for instance, when traveling over rough or muddy roads or when climbing grades.

The invention seeks, as a further object, to provide a device which will be hand operated and will thus be free of the uncertainty of operation attendant upon a foot actuated device.

And the invention seeks, as a still further object, to provide a device which will be simple in its construction and which may be readily applied.

Other and incidental objects will appear hereinafter.

In the drawings:

Figure 2 is a sectional view on the line 2—2 of Figure 1, looking in the direction of the arrows.

Figure 1:
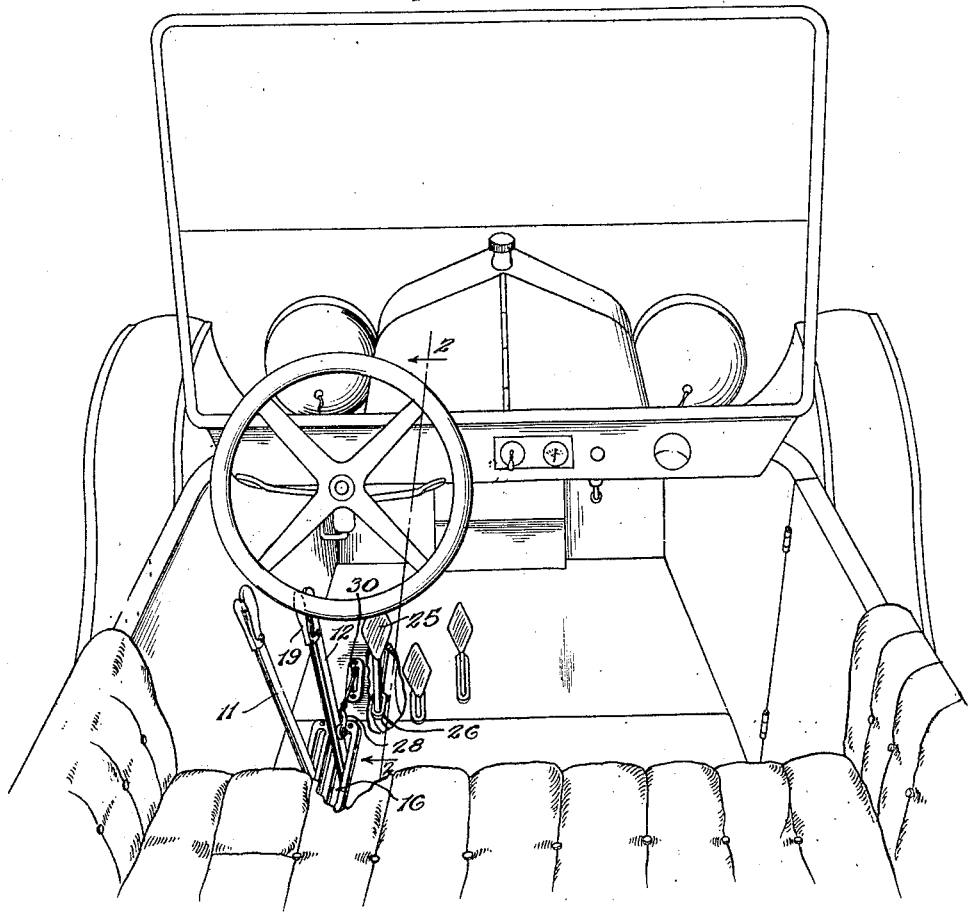
Figure 1 is a perspective view showing my improved device applied.
Figure 3:
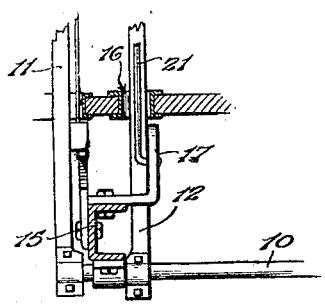
Figure 3 is a detail sectional view on the line 3—3 of Figure 2, looking in the direction of the arrows.
Figure 4:
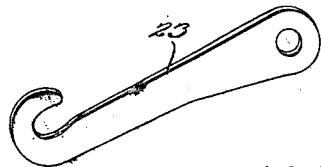
Figure 4 is a detail perspective view of the pulley anchoring hook employed.

Referring now more particularly to the drawings, I have shown my improved device in connection with a Ford vehicle, the usual controller shaft of which is indicated at 10, and mounted upon said shaft at one end is the customary emergency brake lever 11. In accordance with the present invention, I employ a hand lever 12, which, as particularly shown in Figures 2 and 3 of the drawings, is freely mounted upon the shaft 10 by a block 13 at the lower end of the lever and extending through the block and through the lever are bolts 14 detachably securing the lever in position. The lever is arranged close to the adjacent side bar 15 of the vehicle chassis and formed in the floor boards of the vehicle to accommodate the lever is an appropriate slot 16. Bolted or otherwise secured at its ends to the bar 15 to upstand therefrom is a segment 17 extending at the inner side of the lever 12 to form a guide therefor limiting the lever against movement along the shaft 10 and pivoted upon the lower end portion of the lever to coact with said segment is a latch 18. Mounted to rock upon the lever near its upper end is a latch handle 19 actuated by a spring 20 and connecting the handle with the rear end of the latch is a rod 21. Thus, the spring 20 will function to normally maintain the latch engaged with the segment.

One of the usual steering post bracket bolts of the vehicle is indicated at 22. In conjunction with this bolt, I provide an anchoring hook 23 which is secured at one end by the bolt and carried by the hook at its opposite end is an appropriate pulley 24. Arranged to embrace the usual clutch pedal 25 of the vehicle is a split collar 26 clamped around the pedal by a bolt or other suitable fastening device 27 and pivoted upon the lower end portion of the lever 12 is a clevis 28. Secured at one end to the collar 26 is a cable or other suitable flexible element 29 which is passed around the pulley 24 to extend freely through a slot 30 in the floor boards of the vehicle and is connected at its opposite end to the clevis 28. Preferably, a turnbuckle 31 is interposed in said cable for adjusting the effective length thereof.

As will now be seen in view of the foregoing description, the lever 12 may be swung rearwardly upon the shaft 10 for rocking the pedal 25 forwardly and rendering the low speed of the vehicle active when, upon release of the latch handle 19, the latch 18 will be moved to engage the segment 17 for locking the pedal in its forward position. Accordingly, the low speed of the vehicle will be secured active so that the driver of the vehicle may proceed at low speed without the necessity for pressing forwardly upon the pedal. To release the pedal, it will simply be necessary to swing the lever 12 to its forward position when the pedal will rock rearwardly in the usual manner and may then be foot actuated, if desired, without in any way being hampered by the cable 29. I accordingly provide a particularly simple and efficient device for the purpose set forth and, in this connection, it will, of course, be understood that since the lever 12 is freely mounted on the shaft 10, the lever may be swung independently of the shaft while the lever 11 may be swung for rotating the shaft without being hampered by the presence of the lever 12 upon the shaft.

Having thus described the invention, what is claimed as new is:

1. The combination with a motor vehicle having a controller shaft, a clutch pedal, and a steering post bracket secured by a bolt, of a hand lever pivoted upon said shaft, latch mechanism associated with said lever, a hook secured by said bolt, a pulley carried by the hook, and a flexible element to extend between the lever and the pedal about said pulley for rocking the pedal when the lever is swung.

2. The combination with a motor vehicle having side bars, a controller shaft, and a foot pedal, of a rack segment fixed to one of said side bars, a hand lever freely mounted on the controller shaft to extend between said side bar and said segment limited thereby against movement along the shaft, a latch carried by the lever to coact with said segment, and means forming an operative connection between the lever and the pedal for rocking the pedal when the lever is swung.

In testimony whereof I affix my signature.

ESCHOL L. STEPHENS. [L. S.]